United States Patent

[11] 3,534,833

[72] Inventor Robert B. Troyer
 Menomonee Falls, Wisconsin
[21] Appl. No. 699,090
[22] Filed Jan. 19, 1968
[45] Patented Oct. 20, 1970
[73] Assignee A. O. Smith Corporation
 Milwaukee, Wisconsin
 a corporation of New York

[54] FOUR WHEEL SPREADING RAILROAD VEHICLE BRAKE APPARATUS
 6 Claims, 5 Drawing Figs.
[52] U.S. Cl. ..................................... 188/52, -
 188/100, 188/153
[51] Int. Cl. .................................... B61h 13/00
[50] Field of Search .......................... 188/52,
 100(S), 153(+)

[56] References Cited
 UNITED STATES PATENTS
| 2,118,753 | 5/1938 | Basett | 188/153X |
| 2,181,041 | 11/1939 | Basett | 188/52 |
| 2,832,440 | 4/1958 | Browall | 188/52 |
| 2,857,184 | 10/1958 | Mancusi, Jr. | 188/100SUX |
| 3,088,550 | 5/1963 | Kirk | 188/52 |
| 3,177,984 | 4/1965 | Taylor | 188/52X |
| 3,335,825 | 8/1967 | Mersereau et al. | 188/52X |

Primary Examiner—George E. A. Halvosa
Attorney—Andrus, Sceales, Starke and Sawall ABSTRACT: A railroad friction-braking system utilizes a relatively high power air piston cylinder of the "Teflon" seal type, in conjunction with a linkage assembly. The apparatus is used to move the usual set of parallel brake beams to engage connected brake shoes with each wheel in the wheel truck. The air cylinder mounted within the truck bolster is slightly off center and has a piston and rod adapted for movement in a horizontal plane sideways of the truck. The rod is interconnected to a crosslever secured to a fixed pivot on the bolster. A rigid link connects the center of the crosslever to a live brake lever which is pivotally connected to the brake beam on the opposite side of the bolster. Further, a rigid link interconnects the middle of the live lever to the middle of the dead lever which is pivotally attached to the other brake beam. The dead lever is connected at its top end to a dead lever fulcrum. Operation of the air cylinder pivots the live lever and causes the first set of brake shoes to engage their corresponding wheels. The live lever then pivots about the engaged wheels to cause the dead lever to pivot thus engaging the second set of brake shoes with their wheels.

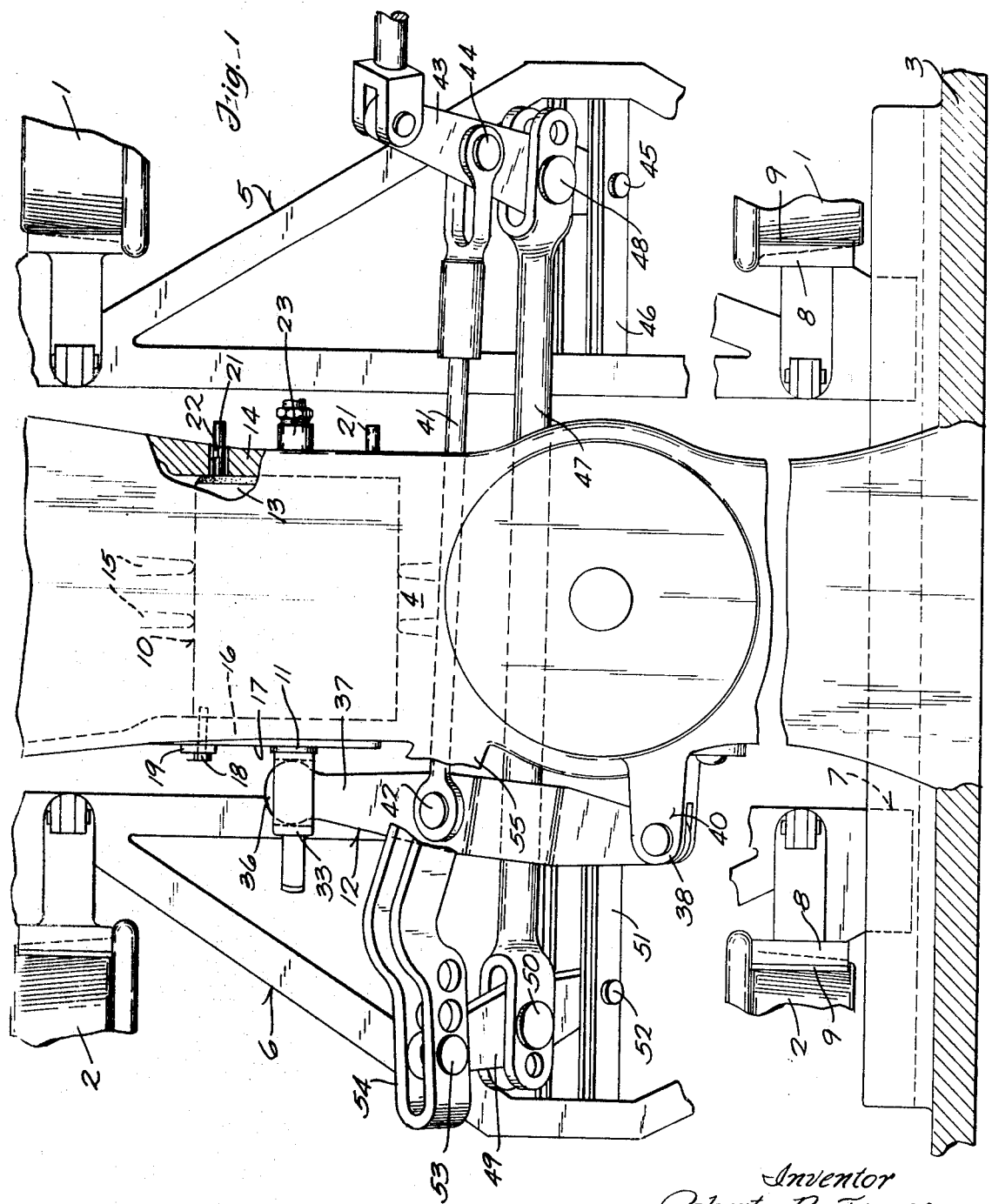

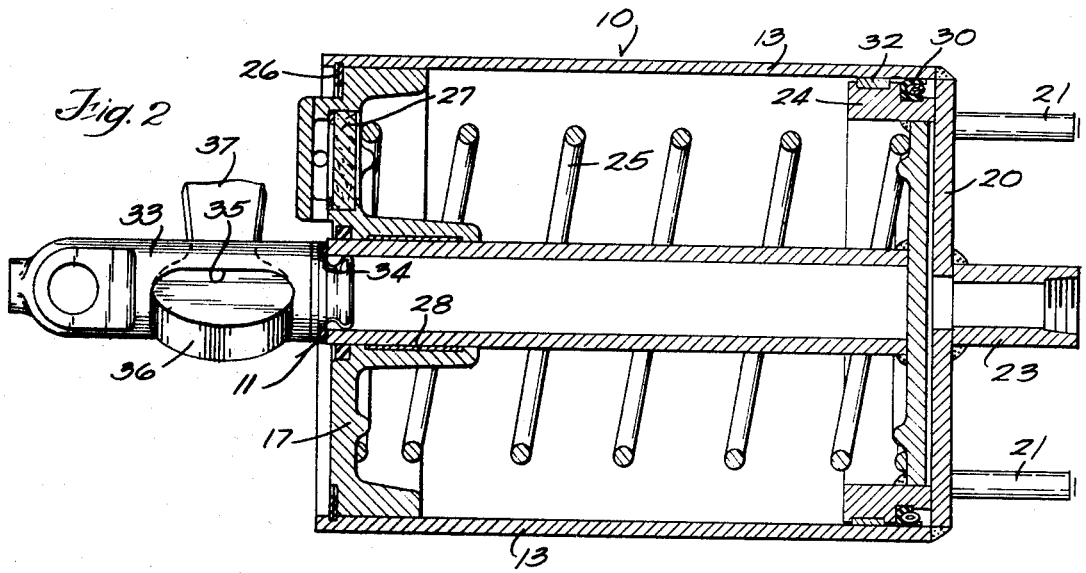
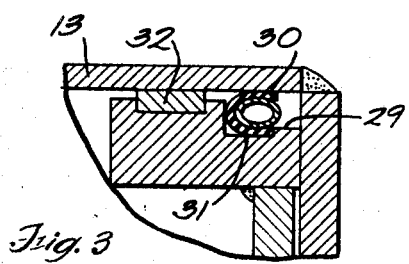
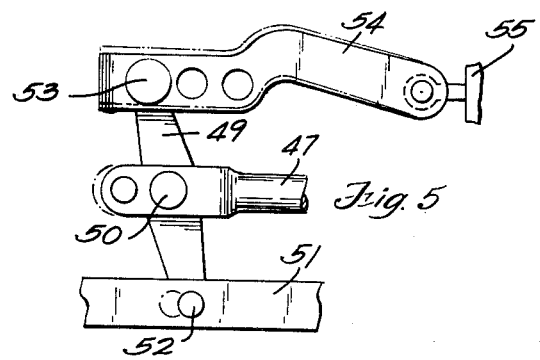
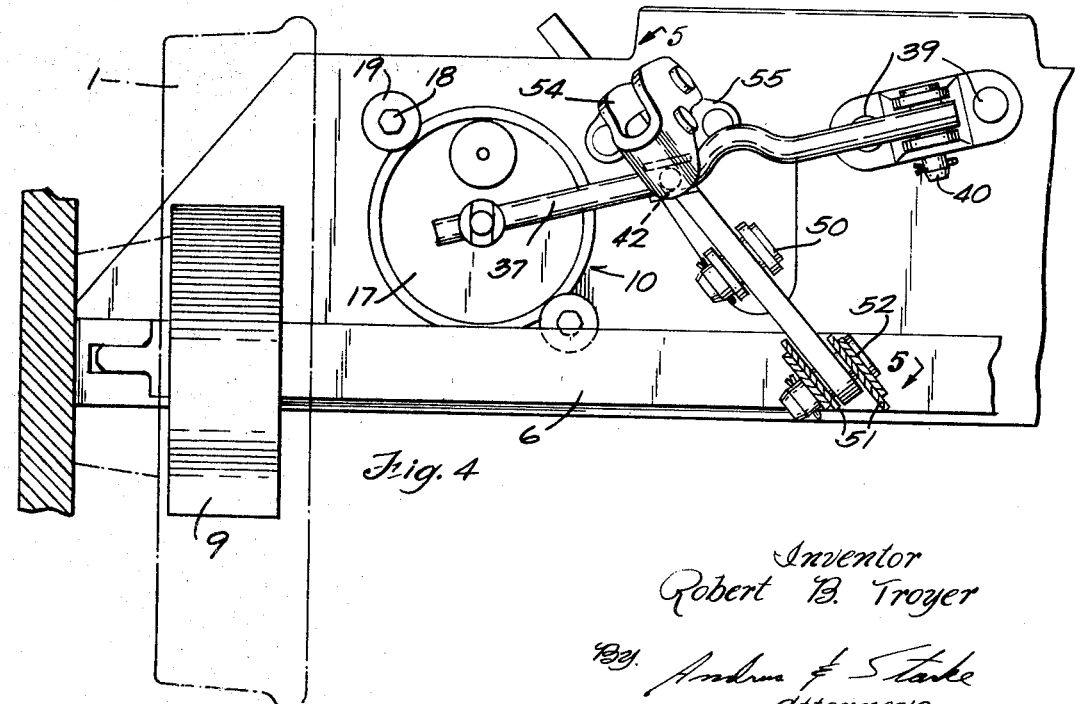

FOUR WHEEL SPREADING RAILROAD VEHICLE BRAKE APPARATUS

This invention relates to a railroad vehicle brake apparatus and particularly to the air actuated brake apparatus having an air cylinder and linkage assembly for applying of the brake means to the wheels.

Railroad vehicles or cars have generally included two axle four wheel trucks at the opposite ends. Each of the trucks includes a crossbeam or bolster to which the wheels are secured and a pair of parallel extending brake beams disposed between the sets of wheels and moved in opposite directions to engage suitable brake shoes with the respective sets of wheels. Various systems for operating or moving of the brake beams have been suggested.

The brake beam may be connected by a linkage to an air activated cylinder-piston motor means for applying the brake shoe against the wheel and providing friction stopping of the railroad car. The required output force of the cylinder-piston motor means can be very substantial particularly where the railroad car is of a relatively heavy construction. Consequently, special constructions of the cylinder are required, particularly to maintain a sliding seal of the piston within the cylinder.

The present invention is particularly directed to a reliable and inexpensive brake apparatus for establishing the necessary braking force on the brake beams of a railroad vehicle.

Generally in accordance with the present invention, the air power cylinder means is mounted directly inside of the bolster of the railroad truck with a piston mounted for sliding movement in a horizontal plane. The shaft or rod extends horizontally outwardly through one of the walls of the bolster and is interconnected to a linkage to provide sequential application of the forces to the brake beams. The cylinder is mounted only slightly off center of the railroad bolster and brake beams to provide a near-central positioning of the operating shaft or rod. A first or live brake lever has its lower end connected to the brake beam and the upper end connected by a connecting pull link to a crosslever which is connected respectively to the bolster and to the outer end of the piston rod. A second or dead brake lever adjacent the output shaft of the cylinder has its lower end connected to the other brake beam and the upper end to a dead lever fulcrum. A push link connects the central portion of the brake levers. Air is supplied to the power cylinder and the related rod moves outwardly pivoting the cross lever outwardly. This exerts a pulling force on the connecting link which is transmitted to the lever and brake beam on the opposite side of the bolster. The pull force pivots the lever and moves the brake beam such that the shoes engage the wheels. The wheels act as a pivot point such that further movement of the lever in addition to exerting a braking force establishes a pushing force on the connecting rod and a related pivot force to the lever connected to the dead lever fulcrum and thereby causes the opposite beam to also move into engagement with the wheel.

This construction has been found to provide near central force application and more important has been found to minimize the vertical loading of the cylinder rod and wear on the linkage. The significance of this is that applicant has found that it can now employ a highly improved cylinder construction wherein the piston is sealed to the wall of the cylinder with a spring loaded plastic seal such as "Teflon" type seal. This provides exceptionally long operating life.

Referring to the drawings:

FIG. 1 is a plan view of a railroad car truck with parts broken away to more clearly disclose the construction of the present invention;

FIG. 2 is an enlarged vertical section through the power cylinder shown in FIG. 1;

FIG. 3 is an enlarged fragmentary view of FIG. 2 more clearly showing a seal structure;

FIG. 4 is a front elevational view of the linkage structure shown in FIG. 1;

FIG. 5 is a fragmentary view taken generally on line 5-5 of FIG. 4.

Referring to the drawings and particularly to FIG. 1 a two axle four wheel railroad car truck assembly is shown having pairs of wheels 1 and 2 mounted to the opposite sides of the truck assembly and interconnected to the opposite ends of each of two axles, not shown. The axles are interconnected to side frame member 3 of a centrally located truck bolster 4 in accordance with any well known or desired construction. A pair of brake beams 5 and 6 are also disposed one each to the opposite side of the truck bolster 4. Each of the brake beams 5 and 6 extends crosswise of the car truck in parallel spaced relation to each other and to the truck bolster 4. The outer ends of brake beams 5 and 6 are similarly constructed and slidably mounted on the side frame members 3 as diagrammatically shown by a sliding tab and groove support 7.

Each brake beam is generally an isosceles triangular-shaped framework which may be formed as a cast iron or a fabricated steel member. The base of the beam is adjacent the bolster and the apex is disposed outwardly generally centrally between the wheels. A brake head 8 is secured to each outer end of the brake beams in alignment with the associated wheels 1 and 2. Brake shoes 9 are releasably interconnected to the brake head 8 and are of the "composition" type. The brake beams 5 and 6 are positioned to provide frictional force engagement of the brake shoes 9 with the associated wheel through the operation of a power cylinder unit or assembly 10 which is mounted within the bolster 4 in accordance with the present invention. The power cylinder assembly 10 includes an output shaft or rod 11 interconnected to a linkage 12 for sequentially actuating the brake beams 5 and 6.

More particularly, the bolster 4 is an inverted box-shaped channel member. The power cylinder unit 10 includes a cylinder or casing 13 disposed within the bolster with a horizontal axis extending in the direction of movement of the truck assembly. The housing 13 fits within a suitable chamber defined in the bolster 4 by the back wall 14 and a plurality of lateral brace walls 15 which are integrally formed with the bolster. The forward wall 16 of the bolster includes an opening for insertion and removal of unit 10. In the assembled relation, the front cylinder wall 17 is aligned with the front wall 16 of the bolster. A plurality of clamping bolts 18 are interconnected to the front wall 16 of the bolster and secure clamping washers 19 in overlapping and clamping engagement to the outer peripheral edge of the front wall 17 to releasably lock the housing 13 within the chamber. The back wall 20 of the cylinder housing 13 includes a pair of antirotation guide pins 21 which extend through corresponding support openings 22 in the back wall 14 of the bolster to properly locate the power cylinder unit 10 in the bolster. An air entrance fitting 23 is secured to the back wall or head 20 of the cylinder housing 13 and projects through an opening in the back wall 14 of the bolster for connection to a suitable air hose.

The cylinder structure itself is most clearly shown in FIG. 2. A cup-shaped piston 24 is slidably mounted within the housing 13 with the outer face of the piston continuously urged toward the back wall or head 20 which thus constitutes the head of the cylinder. A bias spring 25 acts between the piston 24 and forward wall 17 to continuously urge the piston 24 toward the head 20.

The head 17 is removably secured within the cylinder 13 by a retaining ring 26 with the spring 25 urging the head 17 outwardly into clamping engagement with the ring. A filter opening 27 is provided in the removable head 17 to permit ready breathing with respect to the backside of the piston 24. A bearing 28 is secured centrally of the wall 17 to slidably support the piston rod or shaft 11 which extends into the housing and is welded or otherwise secured to the central portion of the piston 24.

In accordance with the present invention the outer corner of the piston 24 is recessed as at 29 to receive a generally U-shaped plastic seal member 30, most clearly shown in FIGS. 2 and 3. The seal member 30 opens outwardly towards the head 20. A suitable ring spring member 31 assists in holding the outer lip in sealing engagement with the inner face of the cylinder. The seal is formed of any suitable self-lubricating type plastic such as that widely sold under the trademark "Teflon". A "Teflon" seal is extremely desirable in that it will operate properly with minimum friction drag while under wide temperature variations such as encountered in railroad car usage. The inner face of the cylinder is preferably chrome plated to present a smooth highly finished surface to the sealing lip of the plastic seal member 30. The U-shaped configuration results in the application of a sealing force to the seal lip when air power is applied via the air tap 23.

A wear ring 32 is provided on the skirt portion of piston 24.

Although this type of seal has been employed in other applications, normally the wear and loading characteristics of the conventional railroad car truck are such that this form of seal has not been considered satisfactory for the power cylinder arrangement in a railroad car. Applicant has found however that the linkage structure as shown and presently described permits use of a similar sealing arrangement for a railroad car truck.

The rod or shaft 11 is generally a tubular member to which a shaft plate 33 is welded or otherwise secured as at 34. The outer end of the shaft plate is provided with a slot 35 having rounded ends. Slot 35 is adapted to receive a disc end 36 of a cross lever 37 forming a part of the interconnecting linkage 12, as most clearly shown in FIGS. 1 and 2.

The cross lever 37 is generally a platelike member having the one end formed in the disc configuration of a diameter somewhat less than the width of the slot 35. The lever is mounted with the disc-shaped end in the slot and as most clearly shown in FIG. 4 extending laterally across the bolster and upwardly with the opposite end pivotally connected within a bifurcated pivot bracket 38 which is bolted to the bolster as at 39 to properly locate the bracket generally in the plane of the crosslever. A pin and cotter key unit 40 firmly fixes the end of the crosslever 37 to the pivot bracket 38.

The power cylinder unit 10 as most clearly shown in FIG. 4 is disposed to the one lateral side of the center of the bolster 4 and in a generally central vertical position.

A pull rod 41 is interconnected to the intermediate portion of the crosslever 37 by a bifurcated pivot pin connector 42 and extends through the bolster 4. The connection of the pull rod 41 is generally to the side of the bolster adjacent cylinder unit 10 and thus to the left of center as viewed in FIG. 4. It extends rearwardly generally in a horizontal plane with the opposite end interconnected to a live brake lever 43 by a bifurcated connector 44 which is threaded into the adjacent end of the link 41. The live brake lever 43 is generally a platelike member with the lower end pivotally interconnected by a suitable pivot pin unit 45 between a plurality of longitudinally extending crossbeam braces 46 forming a part of the brake beam 5. The longitudinal braces 46 are disposed at an angle to the horizontal and vertical plane to mount the live lever 43 extending upwardly and laterally of the bolster and generally at a perpendicular to that of the plane of crosslever 37. This locates the longitudinal braces 46 centrally of the brake beam 5 with the interconnection to the crosslever 42 to the one side thereof. However, the forces transmitted are such as to provide longitudinal movement of the brake beam 5 without undesirable twisting thereof.

A connecting push rod 47 includes an integral bifurcated end which is interconnected to the live lever 43 intermediate the connection of the longitudinal braces 46 to the pull rod 41 by a suitable pin 48. The connecting rod 47 extends back through the bolster 4 with the opposite end similarly pinned to a dead lever 49 for brake beam 6 by a pin 50.

The dead lever 49 is generally similar to the live lever 43 and is interconnected at the lower end in a similar manner to the longitudinal braces 51 of the brake beam 6 by a pin 52. The upper or outer end of the lever 49 is pivotally secured by a pin 53 to a dead lever fulcrum 54, as shown most clearly in FIGS. 1 and 5, with the upper end of the lever located outwardly of the pin 52. Generally the fulcrum 54 is a U-shaped member with the ends pivotally attached to a bracket 55 which is secured to the front wall of the bolster. The dead lever extends between the walls of the fulcrum and is secured therein by a suitable pin 53.

The brake beams 5 and 6 are normally positioned in slightly spaced relation to the wheel 2 as a result of the positioning of the power cylinder piston 24 adjacent the head 20, as shown in FIG. 2, under the action of the bias spring 25. When the brakes are to be applied, air under pressure is applied to the power cylinder unit 10 and particularly between the piston 24 and the head 20. It is well known that very high pressures can be established between the piston and cylinder with the structure of seal 30, as shown in FIGS. 2 and 3. Consequently very high braking forces can be established. The high pressure is transmitted by the outward movement of the piston and piston rod 11 to the crosslever 37 which pivots outwardly, in a counterclockwise direction as viewed in FIG. 1. The pivotal movement of the crosslever 37 exerts a pull on the pull rod 41 which is transmitted to the live lever 43 resulting in a pivotal movement thereof about the pin connection 48. The generally perpendicular mounting of the crosslever 37 and the live lever 43 permits the pivotal movement of the levers without undue lateral loading of the linkage and the piston 24. The lower end of the lever 43 which is connected to the center of brake beam 5 pivots in a counterclockwise direction in FIG. 1 causing the brake beam to move outwardly and moving the shoes 9 into braking engagement with the wheels 2. When the shoes 9 engage the wheels and provide a braking force, they simultaneously constitute a new pivot point for the live lever 43 resulting in pivotal movement of the lever 43 about the brake beam pivot connecting pin 45. This results in a push on the connecting link 47 which in turn results in a corresponding force on the dead lever 49. The lower end of the dead lever 49 can only move in a straight line and the dead lever 49 pivots in a counterclockwise direction about the fulcrum pin 53 to move the brake beam 6 toward the wheels and causing the brake shoes 9 to engage the wheels 2. The fulcrum pin 53 is located outwardly of pin 52 and the pivoting of lever 49 also exerts a cross force in the plane of lever 49. The fulcrum 54 is pivoted to bracket 55 and thus pivots upwardly as shown in phantom in FIG. 5 to accommodate this movement.

Applicant has found that the mounting of the cylinder unit 10 within the bolster provides a protective shield for the cylinder and minimizes the shock forces applied thereto contrasted to the usual direct mounting of the cylinder on a side frame member or the brake beam. The location of the cylinder unit 10 within near center of the bolster and the angularly related levers and linkage establishing central location of the connection to the brake beams 5 and 6 substantially minimizes the vertical loading on the cylinder unit and linkage system 12 and thus permits the use of a small compact power cylinder unit with a plastic-type seal.

I claim:

1. A railroad vehicle braking apparatus having first and second brake beams and a bolster, a fluid power cylinder unit mounted within said bolster and having a horizontal shaft, said fluid cylinder unit including a head including a fluid source connector and a piston secured to said shaft and having a sealing member disposed between the piston and the cylinder wall, and a linkage interconnecting said shaft to said brake beams and including a pair of brake levers connected one each to said beams and interconnected by a first connecting rigid link extending through said bolster, a first fixed pivot support secured to the bolster in laterally and vertically spaced relation to said shaft, and a crosslever disposed between said brake levers and connected at one end to said shaft and extending laterally and vertically therefrom across the bolster to said first fixed pivot support, and a second rigid link constituting a pull member extending longitudinally from the one side of the bolster through said bolster to the opposite side and connecting said cross lever to the first brake lever on the opposite side of the bolster, a second pivot support connected to the second brake lever on the same side of the bolster as the crosslever to pivotally support the corresponding brake lever, said levers being located and arranged to minimize lateral loading of the connections and thereby vertical loading of the cylinder unit.

2. The brake actuating apparatus of claim 1 wherein said piston includes an encircling corner recess, a self-lubricating plastic seal member disposed within the recess and having a sealing lip engaging an inner wall of the cylinder unit and projecting toward said head.

3. The brake actuating apparatus of claim 1 wherein said piston includes an encircling corner recess, a self-lubricating plastic seal member disposed within the recess and having a sealing lip engaging an inner wall of the cylinder unit and projecting toward said head, the inner wall of said cylinder being finished to present a smooth sliding sealing surface to said lip.

4. The railroad vehicle braking apparatus of claim 1 wherein:
said fluid power cylinder unit is mounted to one side of center of said bolster and immediately above the plane of the brake beam;
said crosslever is pivotally connected to said shaft and extends laterally and upwardly from said shaft to said first fixed pivot support on the face of said bolster, said second rigid link being connected to the central portion of said crosslever and extending substantially horizontally through said bolster to said one side of center and connected to the outer end of the first brake lever, said brake levers being coplanar and extending upwardly and laterally from the related brake beams, said first link being connected to said first brake lever between the connections to the second rigid link and to the first brake beam and extending through said bolster, to said one side of center, and said second pivot support including a fulcrum pivotally connected to said bolster and to the upper end of the second brake lever outwardly of the connection to the second brake beam to actuate the second brake beam.

5. The railroad vehicle braking apparatus of claim 1 wherein, pull member extends substantially horizontally through said bolster, said first brake lever being connected to the outer end of the pull member and the first brake beam, said first rigid link being a push member connected to said first brake lever between the connections to the pull member and to the first brake beam and extending through said bolster, said second brake lever pivotally connected to the second brake beam and to the bolster and said push member being pivotally connected to an intermediate portion of the second of said brake levers to actuate the second brake beam.

6. The railroad vehicle braking apparatus of claim 1 wherein,
said crosslever includes a disc end mating with a slot in the outer end of said shaft and extends laterally and upwardly therefrom, said first fixed pivot support including a pivot axis generally perpendicular to the principal plane of said disc end, said pull member pivotally connected to said crosslever with a pivot axis perpendicular to the plane of said disc end and extending substantially horizontally through said bolster, and pivotally connected to the first brake lever to the opposite side of the bolster, said last named brake lever being a live lever connected to the adjacent brake beam and extending upwardly at an angle normal to the crosslever, said first rigid link being a push member connected to said live brake lever between the connections to the pull member and to the first brake beam and extending through said bolster, said second brake lever being a dead lever pivotally connected to the second brake beam and extending upwardly in the same plane as said live lever, said second pivot support including a fulcrum pivotally connected to the bolster, and a pivot connection between the fulcrum and upper end of the dead lever located outwardly of the pivot connection of the dead lever to second brake beam to actuate the second brake beam.